(12) United States Patent
Duarte et al.

(10) Patent No.: US 8,291,348 B2
(45) Date of Patent: Oct. 16, 2012

(54) COMPUTING DEVICE AND METHOD FOR SELECTING DISPLAY REGIONS RESPONSIVE TO NON-DISCRETE DIRECTIONAL INPUT ACTIONS AND INTELLIGENT CONTENT ANALYSIS

(75) Inventors: Matias Duarte, Sunnyvale, CA (US); Daniel Shiplacoff, Los Angeles, CA (US); Gregory Simon, San Francisco, CA (US); Renchi Raju, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 881 days.

(21) Appl. No.: 12/347,873

(22) Filed: Dec. 31, 2008

(65) Prior Publication Data
US 2010/0169766 A1  Jul. 1, 2010

(51) Int. Cl.
*G06F 3/033*  (2006.01)
*G06F 3/14*  (2006.01)
*G06F 17/00*  (2006.01)

(52) U.S. Cl. .................. 715/863; 715/864; 715/204
(58) Field of Classification Search .............. 715/863, 715/864, 204
See application file for complete search history.

(56) References Cited

U.S. PATENT DOCUMENTS

| | | | |
|---|---|---|---|
| 6,061,050 A | 5/2000 | Allport et al. | |
| 6,407,757 B1 | 6/2002 | Ho | |
| 6,441,811 B1 | 8/2002 | Sawada et al. | |
| 6,614,455 B1 * | 9/2003 | Cuijpers et al. | 715/810 |
| 6,765,559 B2 | 7/2004 | Hayakawa | |
| 7,170,500 B2 | 1/2007 | Canova, Jr. | |
| 7,249,325 B1 | 7/2007 | Donaldson | |
| 7,394,452 B2 | 7/2008 | Wong et al. | |
| 7,492,350 B2 | 2/2009 | Fabre et al. | |
| 2002/0030699 A1 * | 3/2002 | Van Ee | 345/810 |
| 2004/0189720 A1 | 9/2004 | Wilson et al. | |
| 2004/0204128 A1 * | 10/2004 | Zakharia et al. | 455/566 |
| 2005/0047629 A1 * | 3/2005 | Farrell et al. | 382/117 |
| 2006/0010395 A1 | 1/2006 | Aaltonen | |
| 2006/0033701 A1 | 2/2006 | Wilson | |
| 2006/0097983 A1 * | 5/2006 | Haggman et al. | 345/156 |
| 2006/0177112 A1 * | 8/2006 | Yang et al. | 382/120 |
| 2007/0192749 A1 * | 8/2007 | Baudisch | 715/863 |
| 2007/0220440 A1 | 9/2007 | Song et al. | |
| 2007/0245263 A1 | 10/2007 | Hale et al. | |
| 2008/0168401 A1 | 7/2008 | Boule et al. | |
| 2008/0172618 A1 * | 7/2008 | Han | 715/738 |
| 2008/0309626 A1 | 12/2008 | Westerman et al. | |
| 2009/0006938 A1 * | 1/2009 | Yoo et al. | 715/205 |
| 2009/0058820 A1 * | 3/2009 | Hinckley | 345/173 |
| 2009/0064047 A1 * | 3/2009 | Shim et al. | 715/835 |
| 2009/0128505 A1 * | 5/2009 | Partridge et al. | 345/173 |

FOREIGN PATENT DOCUMENTS

AU  2008-100003 A4  2/2008

OTHER PUBLICATIONS

Olwal, A., Feiner, S., and Heyman, S. Rubbing and Tapping for Precise and Rapid Selection on Touch-Screen Displays. Proceedings of CHI 2008 (SIGCHI Conference on Human Factors in Computing Systems), Florence, Italy, Apr. 5-10, 2008, pp. 295-304.*

(Continued)

*Primary Examiner* — Adam M Queler
*Assistant Examiner* — Andrea Long
(74) *Attorney, Agent, or Firm* — Van Mahamedi

(57) ABSTRACT

A computing device includes a display surface, a human interface feature, and processing resources. The human interface features enables a user of the computing device to enter a non-discrete directional input action. The processing resources execute to: (i) provide content on the display surface; (ii) detect the user performing the input action; (ii) determine a vector from the input action; and (iv) select a region of the display surface based on the vector.

12 Claims, 6 Drawing Sheets

OTHER PUBLICATIONS

Christopher F. Herot and Guy Weinzapfel. 1978. One-point touch input of vector information for computer displays. In Proceedings of the 5th annual conference on Computer graphics and interactive techniques (SIGGRAPH '78). ACM, New York, NY, USA, 210-216.*

Willems, Don and Niels, Ralph Definitions for Features used in Online Pen Gesture Recognition Aug. 19, 2008 24 pages.*

International Search Report, Written Opinion and Notice of Transmittal of same mailed Sep. 7, 2010 in International Application No. PCT/US2009/068832.

* cited by examiner

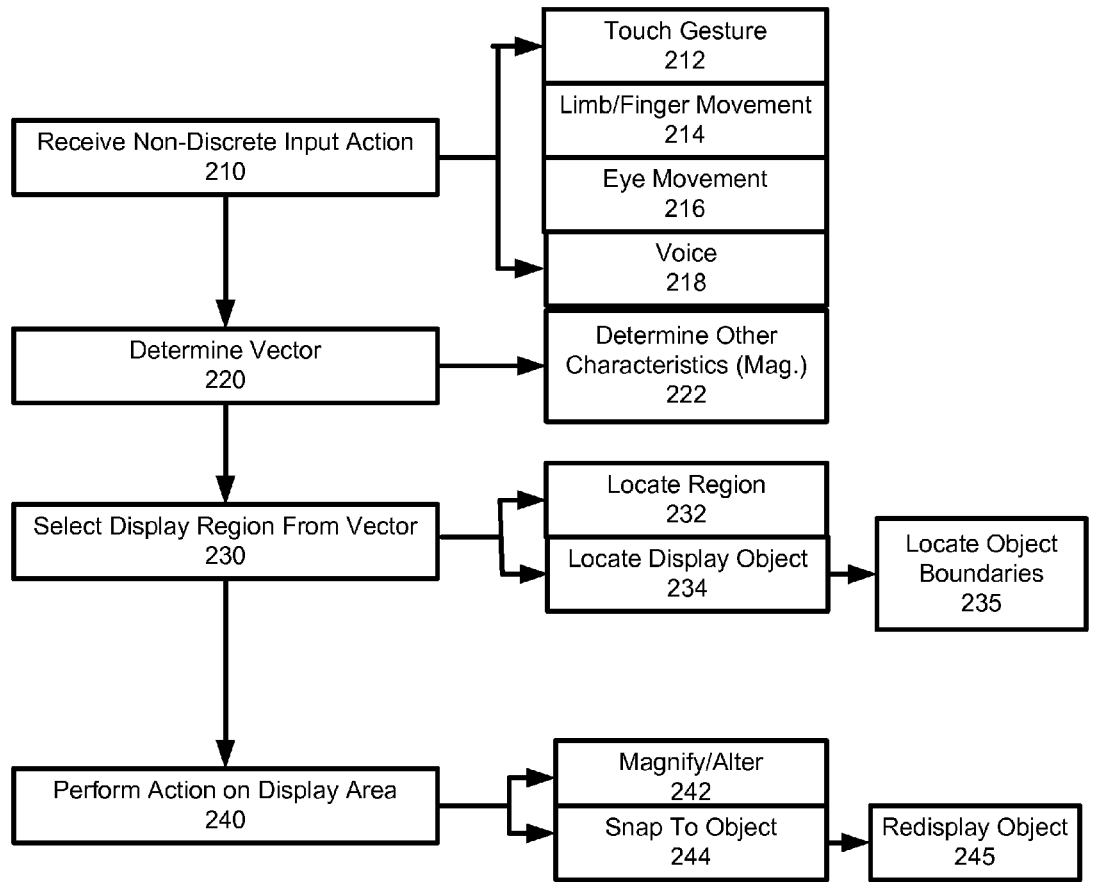
FIG. 2
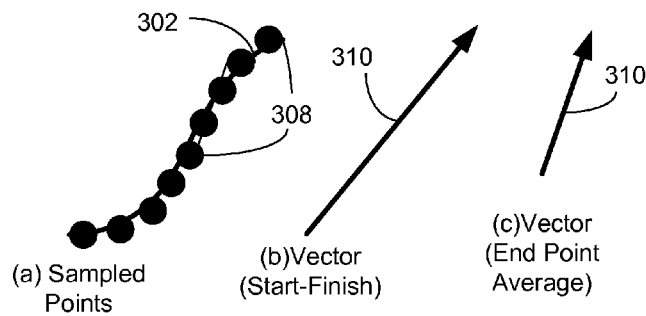
FIG. 3A  FIG. 3B  FIG. 3C

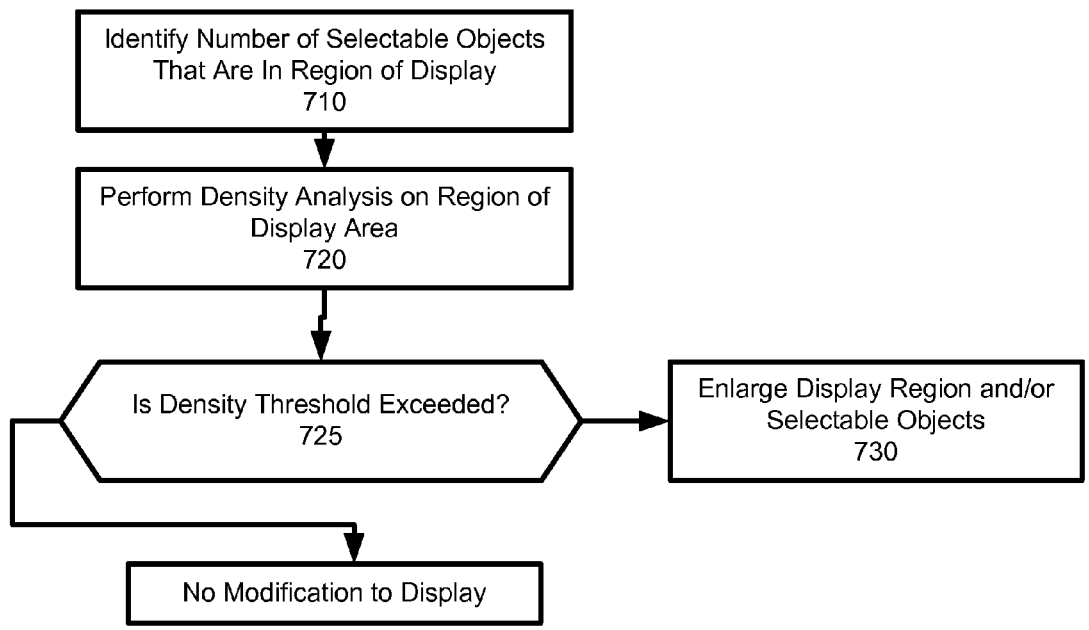
FIG. 7
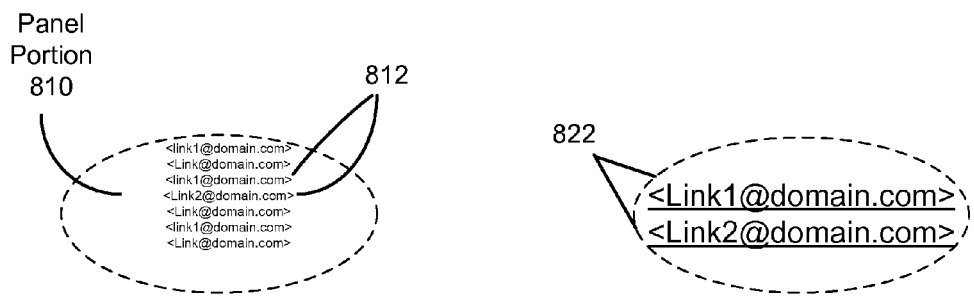
FIG. 8A   FIG. 8B

COMPUTING DEVICE AND METHOD FOR SELECTING DISPLAY REGIONS RESPONSIVE TO NON-DISCRETE DIRECTIONAL INPUT ACTIONS AND INTELLIGENT CONTENT ANALYSIS

TECHNICAL FIELD

The disclosed embodiments relate to display interfaces for computing devices. More particularly, the disclosed embodiments relate to a computing device and method for selecting display regions responsive to non-discrete input actions and/or intelligent content analysis.

BACKGROUND

Computing devices, particularly handheld and portable devices, have evolved to include numerous types of human interface features. Among them, devices now incorporate touch-sensitive displays and sensors in order to enhance the human interaction with the device. Examples of sensors include accelerometers and proximity sensors, which detect information as to movement or where a computing device is being held.

Increasingly, devices are smaller and more intelligent. Thus, while the display size is limited, what can be shown on the relatively small display screens is increasingly more sophisticated. For example, mobile computing devices can routinely display web content, videos, and live television content from one display.

In addition to smaller size and increased processing, computing devices also enable more kinds of user input and actions. For example, gesture input is a type of input that is enabled on mobile computing devices that incorporate touch sensitive display screens. Other devices exist that can detect movement by the user, such as through the motion of arms or the hand.

BRIEF DESCRIPTION OF THE DRAWINGS

FIG. 2 illustrates methods for using non-discrete input actions to select displayed content for re-display, according to embodiments.

FIG. 3A through FIG. 3C illustrates the transformation of a non-discrete directional input action of the user into a vector.

FIG. 7 illustrates a method for re-displaying a region of a display that incorporates selectable data items in excess of a designated criteria, according to an embodiment.

FIG. 8A and FIG. 8B represent user interface panels that are an implementation of an embodiment depicted in FIG. 7.

DETAILED DESCRIPTION

Figure 1:
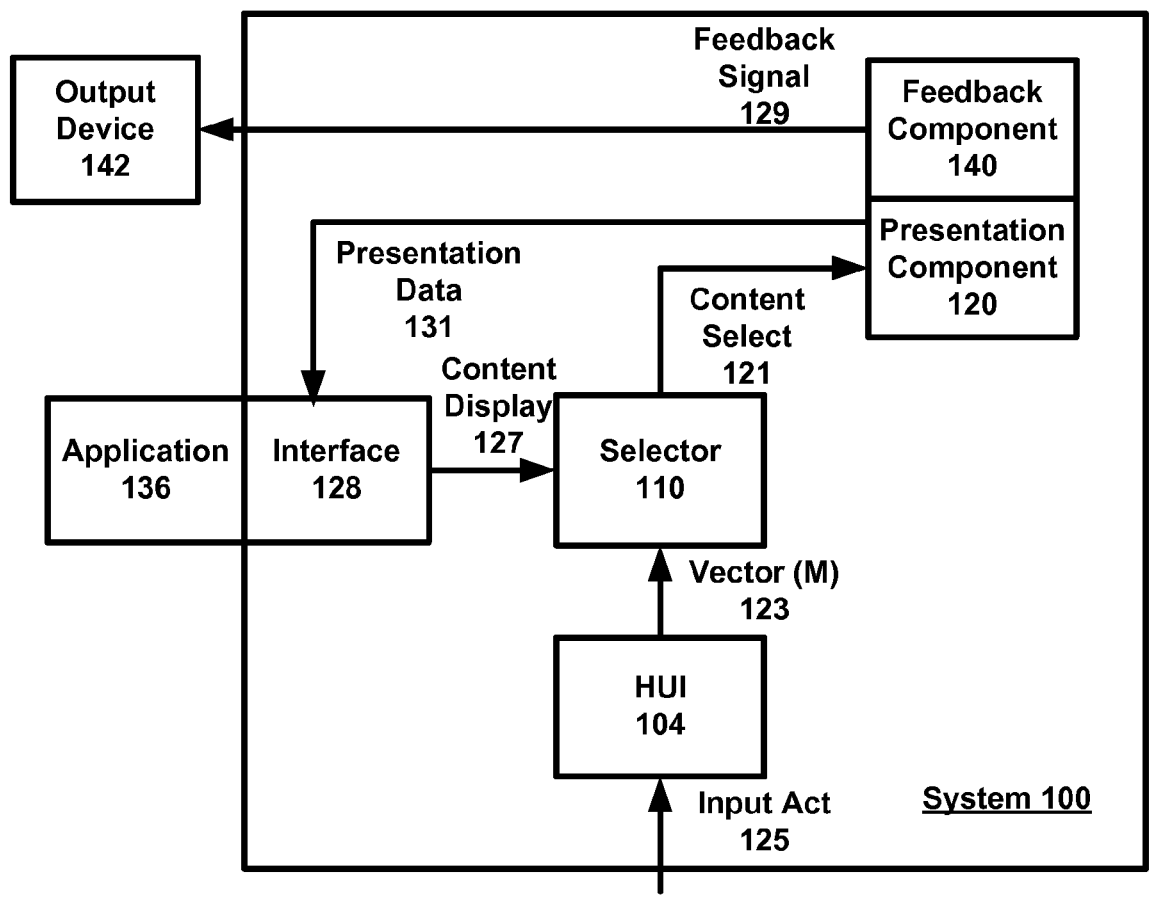
FIG. 1 illustrates a simplified block diagram architecture for enabling features for intelligent scrolling or navigation of display objects on a computing device, according to an embodiment.

Embodiments described herein enhance a user's ability to scroll or navigate displayed content on a computing device through use of non-discrete input from a user. In particular, one or more embodiments use logic or intelligence to enhance a user's ability to use non-discrete directional input actions to make selections of displayed content. As described, embodiments enhance the user's interaction with the computing device, by enabling selection of content in response to non-discrete input actions of the user.

Embodiments described herein include a computing device having a display surface, a human interface feature, and processing resources. The human interface features enables a user of the computing device to enter a non-discrete directional input action. The processing resources execute to: (i) provide content on the display surface; (ii) detect the action the user performs; (ii) determine a vector from the input action; and (iv) select a region of the display surface based on the vector.

In another embodiment, a computing device includes a display region and processing resources that are configured to present content on the display surface, including a plurality of selectable data items on a sub region of the display surface. The processing resources are further configured to analyze at least a portion of a content on display that includes the plurality of selectable data items to determine a spacing between at least some of the plurality of data items. Responsive to determining that the spacing between the selectable data items is less than a pre-determined threshold, the processing resources execute to re-display at least a portion the content to enhance the user's ability to select a desired data item and not inadvertently select an undesired data item. For example, content containing closely packed links on a touch-sensitive display surface may be re-displayed to zoom in on the links, thus making the links distinguishable to the user for touch selection.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Architecture

FIG. 1 illustrates a simplified block diagram architecture for enabling features for intelligent scrolling or navigation of display objects on a computing device, according to an embodiment. In an embodiment, a system 100 is implemented on a computing device and includes one or more modules or components that operate to provide a selector 110, a human interface component 104, a presentation component 120, and an interface 128 to an application 136 from which content is generated for display. As described with an embodiment of FIG. 9, system 100 may be implemented on various kinds of devices, including wireless messaging and telephony devices, or wireless/cellular multi-function devices. System 100 may also be implemented across multiple types of devices. Accordingly, the system 100 may be implemented on the computing device 900 (FIG. 9) running application 136 to generate content on a display of the device. In an embodiment shown by FIG. 1, the application 136 corresponds to a web browser, and the content generated on the display device is web content. However, application 136 may correspond to other kinds of applications, so that other forms of content may be presented for use by system 100. For example, the application 136 may correspond to a mapping application (e.g. GOOGLE EARTH, or map typically displayed with GPS), PDF viewer, Image viewer, or a document display application.

Figure 9:
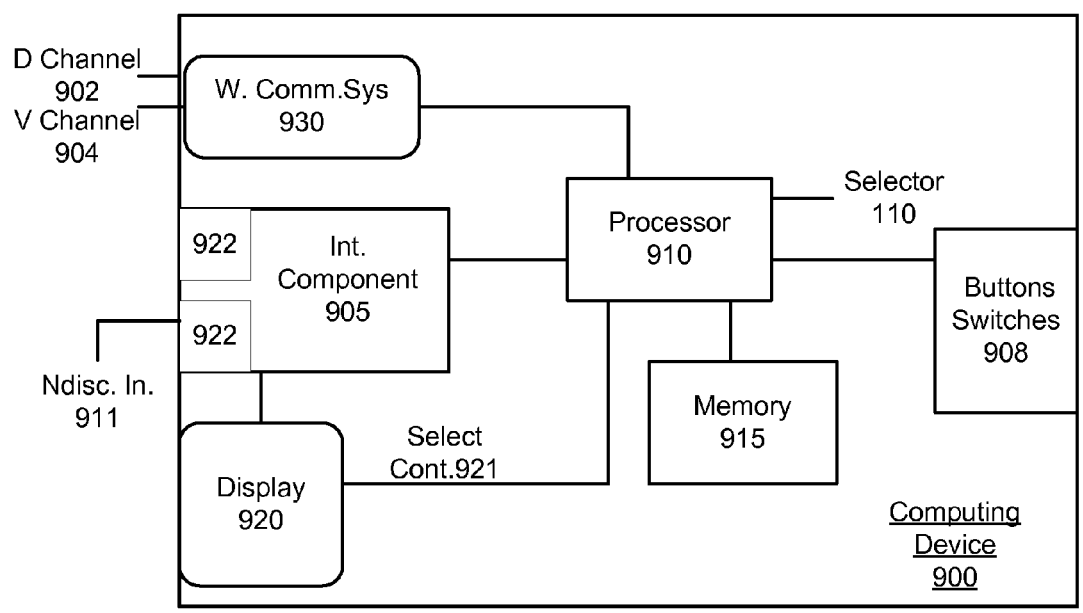
FIG. 9 illustrates a hardware diagram for a computing device that is configured to implement one or more embodiments.

The human interface component 104 may take various forms. In embodiment, the human interface component 104 is provided by touch sensors that are incorporated into a display assembly 920 of the computing device 900 (FIG. 9). The touch sensors detect finger motions or gestures that correspond to a non-discrete input actions 125. However, other devices or types of interfaces may be used to detect such directional input actions. As provided below, non-discrete actions may correspond to acts of the user that require sampling or similar processing in order to be interpreted or processed by a computer. Such acts may be distinguishable from, for example, button presses or actions that actuate switches, as button and switches are discrete input mechanism, and require no sampling to be understood by a computer. The human interface component 104 may further include or use logic (e.g. such as provided by integrated circuits, or by CPU) to calculate the vector 123 from the directional input action 125. Vector 123 may provide a linearized version of the input that enables the directional action 125 of the user to be extrapolated to a region of on a display surface of the computing device 900 (see FIG. 9).

In an embodiment, the interface 128 provides content display information 127 to the selector 110. In an embodiment in which the application 136 is a web browser, the content display information 127 corresponds to document object model (DOM) information, which identifies, for example, the presence and relative position of various display objects and items of content on a given web page or resource. Various other forms of content display information 127 may be used, particularly for other types of applications.

Selector 110 uses the vector 123 to navigate or scroll what is presented on the display. In particular, an embodiment provides that selector 110 uses the vector 123 to navigate or scroll to a display object or region of content that is currently being displayed on a display surface of the computing device. In particular, modules of system 100 process the action 125 to determine the vector 123, and then use the vector 123 to make content selection 121. The content selection 121 may correspond to (i) a region of content on display, or (ii) a display object or set of objects that appear as part of the content on display. For the content selection 121, the presentation component 120 performs an act to redisplay the content selection 121.

In one embodiment, the selector 110 processes the input action 125 by using the vector 123 to extrapolate, from a current position of focus on displayed content, to a new position. The vector 123 specifies a direction of the extrapolation, as well as optionally a magnitude of how far to extend the linear extrapolation. The magnitude may be determined from velocity of the input action 125 (e.g. a finger swipe) or force/acceleration of such movement or action. Thus, the vector 123 may carry directional information, and magnitude information (e.g. force, velocity of combination thereof).

In an embodiment, selector 110 identifies a sub region of content on display from vector 123. The sub region may correspond to, for example, a quadrant or section of a screen display, such as the top portion of a rendered web page. As an alternative or addition, selector 110 identifies a display object that is to be re-displayed based on the vector 123. Examples of display objects include images, text blocks, or links.

In determining the display object or sub region that is to be re-displayed, an embodiment provides that the selector 110 enables a display process of the computing device to navigate or scroll from one region of focus for the content on display to the selected region or display object. The existing region of focus may be identified by, for example, from default (e.g. start from center of display region), from the location of a pointer or navigation device, or from the previous location of a selected display object or region (as determined from, for example, previous vector input determination). Thus, for example, in response to determining vector 123, the selector 110 may cause the processing resources of the device to traverse its focus of display from a portion of a web page to a display object that is existing on the web page.

The selection determination 121 is used by the presentation component 120 to re-display the existing content with alteration and/or focus on the selected sub region or display content (as determined by selector 110). In an embodiment, the presentation component 120 enhances the portion of the displayed content where the selected sub region or display object is provided. The enhancement may take the form of enlarging the selected portion. As an alternative or addition, the enhancement may include, for example, highlighting, backlighting or brightening the displayed content at the selected portion, altering the granularity or focus at that portion, centering the selected content, and/or presenting the selected sub portion in focus.

The presentation component 120 may interface with the application and/or other display component directly or indirectly. In one implementation, the presentation component 120 sends data 131 for generating enhanced display of the selected sub region or display object to the interface 128 of the application 136. For example, when application 136 corresponds to a web browser, the presentation component 120 sends the presentation data 131 to its interface 128. The interface 128 may then re-display the selected sub region or display object in place of an existing portion of the content already on display. For example, the selected content may be enlarged to overlay other content on the display screen. Alternatively, the presentation component 120 may communicate the presentation data 131 directly to the application, or to another application that creates a display content to overlay or substitute the content already on display.

In an embodiment, system 100 includes a feedback component 140 which signals a haptic and/or audible feedback 129 to an output mechanism 142, to coincide with presentation component 120 re-displaying or otherwise presenting the selected content. In an embodiment in which selector 110 identifies a display object, the presentation component 120 may traverse to the selected object immediately, so as to snap to and re-display the selected object. To enhance the snap effect, feedback component 140 synchronizes or otherwise times the feedback signal 129 to coincide with selection and re-display of the selected display object. In other embodiments, the mechanism 140 and its feedback signal 129 may be configured to trigger with the act of re-displaying a region of content on display (rather than a selected object, or enhancing the snap effect). The output mechanism 142 may correspond to a component that produces a vibration or movement when receiving signal 129. As a variant, the output mechanism 142 may produce an audible sound to simulate a physical effect, such as a 'tick' or 'click' sound. The output mechanism 142 may be integrated with the display, or with a device surface that touches or otherwise interacts with the user. For example, the output mechanism 140 may be integrated with the display surface that receives the user's finger when the user makes a gesture input. As a variant, the output mechanism 140 may be integrated into the shell of a computing device that is held by the user, on which the system 100 is implemented on.

Methodology

FIG. 2 illustrates methods for using non-discrete input actions to select displayed content for re-display, according to embodiments. Embodiments such as described with FIG. 2 may be implemented using components such as described with FIG. 1, or hardware elements such as described with FIG. 9. Accordingly, any reference made to elements described with FIG. 1 or FIG. 9 is intended to illustrate suitable elements or components for performing a step or sub-step being described.

In step 210, input is received in the form of a non-discrete input action. The non-discrete input action may correspond to a free-form action of the user, such as a movement of a finger (i.e. placed in contact with a surface) or limb, that is distinguishable from discrete input actions such as button presses or user-manipulated switches. In one embodiment, the non-discrete input action is detected in analog form. Sampling may be used to processes the input.

According to an embodiment, the non-discrete input action may be analyzed to infer a directional intent of a user. Such an input action may be referred to as being directional. The input action may be received by the human interface component 104. The interface component 104 may correspond to a combination of sensors and logic (e.g. in form of integrated circuits) that can monitor, for example, certain types of user activities. On the surface of the display, for example, the sensors may be positioned to detect contact by human skin, and further detect information about the position of the skin in contact at a given instance or over time. Another form of input may incorporate use of an optical sensor, which can be used to detect, for example, movement of a finger or object over a region of the computing device. Other sensors may include accelerometers, which can be placed on a wand or other device to report the position of the wand as the user waives it around. Numerous other implementations for how the non-discrete input action may be implemented also exist. For example, a roller ball input mechanism (or sometimes called a track ball) may carry non-discrete input, in form of magnitude and/or direction. Even switched input mechanism may be structured to detect and use information that relates to magnitude of the action. The detection of magnitude may be by way of detecting an associated non-discrete action or characteristic with, for example, a switch event.

Optional sub-steps 212-218 illustrate various kinds of non-discrete input actions that may correspond to directional input for use with one or more embodiments. In sub-step 212, the input action may correspond to a gesture input, made by the user's finger or user-directed object (e.g. stylus or pen) interacting with an interface component of the computing device. The interface component may correspond to, for example, a touchpad or touch screen of a computing device. Sub-step 214 provides that the non-discrete directional action may correspond to a movement by the user. For example, the user may move a hand or limb or head. The interface component may correspond to sensors incorporated into a device used by the user in moving the limb or other body part. For example, a combination of accelerometers and/or position sensors may be used to enable the device to move a wand. Sensor information from the wand may be received on the computing device and then interpreted into a gesture or movement input.

Sub-step 216 provides that the non-discrete input action corresponds to eye movement by the user. The user's eye movements may be monitored using, for example, an eye scanner/detector. In one implementation, the user's eye is tracked to interpret gesture-like input. The user may direct his vision to an area of the displayed content, or a region of the display screen, in order to have his eye movement registered as a directional input action.

Still further, optional sub-step 218 provides that the non-discrete input action corresponds to a voice command and/or inflection. The user may speak certain words that indicate direction (e.g. 'up' 'north' north east' '30 degrees from center' etc.). Inflection may also be used to indicate magnitude. The interface components of the computing device may correspond to a microphone, which uses speech recognition logic to convert the spoken words into directional input. To detect inflection, the microphone may analyze the volume, as compared to a baseline (e.g. the user's normal speech patter, background noise etc.) to determine whether the command was spoken loudly or softly, possibly in terms of relative degrees.

In step 220, a vector is determined from the user's non-discrete input action (e.g. input action 125 is used to generate vector 123). The vector is a linearization of the non-discrete input. As such, the vector carries information that corresponds to direction. Optionally, sub-step 222 provides that the vector is generated to carry information that includes an indication of magnitude in the directional action of the user (as may be detected by the human interface component 104). Such magnitude may be determined using, for example, sensor or other components that measure characteristics such as speed or force in gesture/movement, or inflection in voice commands.

In step 230, the vector is used to select a region of content that is on or for display. The vector may be used to extrapolate or determine a portion of the content based on an existing assumed position or origin of the vector. This position may correspond to, for example, the user's prior selection of content, the position of a pointer device or feature (e.g. hover or focus on a specific content item, mouse pointer (or equivalent position)), or a default point of origin (e.g. center of display, hover on specific content etc.) Sub-step 232 describes one implementation in which the selected region corresponds to a sub region of existing content under display, or otherwise prepared for display. The sub region may be selected as a panel, indiscriminately of, for example, the boundaries of specific content items within the panel. For example, content may be displayed in form of a map or a rendered web page. In response to the user's gesture input, the selector 110 selects a quadrant or other section of the map, which may or may not be off-display at that instance (portion of the map that is not in view on the boundaries of the display). In the case of a map, a geographic region or granularity represented on the map content may be selected, such as a square mile or city block. Still further, the selected region may carry characteristics that delineate the region from other portions of the surrounding content. For example, the selected region may be part of a structured set of data that is distinguishable from displayed data in surrounding regions.

In a variant to sub-step 232, sub-step 234 provides that a display object is selected from the vector. An example of a display object is an image, text block or other entry. Rather than select, for example, a section of a panel or rendered content by section, analysis is performed to identify a specific content item. In one embodiment, the content on display is a web page or other web content. The selector 110 identifies display objects (e.g. text block, image) on the web page using, for example, DOM information. In other implementations, other forms of content analysis may be used to detect other content items. For example, in a document, the insertion and position of a graphic or media is readily detectable. Shade or color analysis may also be performed to detect presence of an image. The interface component 128 may interface with the browser or the web page, for example, to provide the DOM information to the selector 110.

In a variation in which the display object is selected, the manner in which the selection is made may be performed as follows. As part of sub-step 234, the boundaries of the selected display object are identified in a sub-step 235. Such boundaries may be identified from, for example, (i) DOM information (when the content being displayed is a web page) or its equivalent (for other forms of rendered content), (ii) image analysis, such as discovery of an image file or detection of change in shading or color, (iii) grid/map information.

Once the selected content is determined, step 240 provides that an action is performed to the selected content. If the content is already being displayed, this action may correspond to re-displaying the content with alteration, such as with magnification (sub step 242), colorization alteration, enhancement, or delineation from the remainder of the content (use color or other visual effect to present the remainder of the content as background).

In an implementation in which the selected content is a display object, an embodiment provides that in sub step 244, the selected display object is snapped to and then re-displayed. The snap refers to a graphical user interface sensation in which the selected display object is selected as a whole for the user. In one implementation, the snap is performed so that no objects or display surface between the origin and the selected object are selected, but rather the selected display object is placed in a pre-selected or re-displayed state automatically. The re-display of the selected display object may be in the form of an enlargement or other augmentation/alteration such as described above.

Still further, the snap may be performed to determine a boundary of edge of content that is deemed structured and apart from other content (but indicated by the vector of the action). Such content may be grabbed and aligned on the display. Alignment may include, for example, presenting all of the bounded on the display, centering the bounded content, or just re-positioning it in the presentation.

The following provide examples of embodiments such as described with FIG. 2 and elsewhere herein.

Example

A web browser may render content from a news site on a mobile computing device that uses a touch-sensitive display. When a page from the site is displayed, the content on display includes articles separated by images and other blocks. When the user wishes to direct the computing device's focus to a specific article appearing at a given instant in a corner of the display screen, he can enter a gesture onto the screen that is in the form of a line. The line gesture may be directed either away or towards the desired content, depending on the implementation. The computing device may then vectorize the input to determine the vector. The selector running on the computing device identifies the desired article, and the display snaps to it. In snapping to the article, the selected article may be re-displayed by position (centered), aligned (e.g. with the edge of the display screen) and/or by size (enlarged). Tactile feedback may be provided to provide a physical tick when the content is selected. Audible sounds may also be used (e.g. ticks).

Example

On a device displaying a map with use of GPS information, the user may enter a voice command that indicates direction. Examples include "next block up" or "North east" or "Next City North". The user's input is vectorized, then the selected geographic region of the map on display is selected and re-displayed to the user.

Linearization of Non-Discrete Directional Action

FIG. 3A through FIG. 3C illustrates the transformation of a non-discrete directional input action of the user into a vector. In an embodiment, the non-discrete directional input is provided by a gesture 302 (e.g. finger stroking a display area or surface) or movement (the user moving a finger or limb in the air). As mentioned, non-discrete actions are distinguishable from more traditional input actions such as button presses or switch operations because (i) non-discrete actions may require the processor to sample the input to interpret or understand the input, and/or (ii) enable the action of the user to be free-form, provided it is performed in a manner that can be detected by a sensor. Non-discrete input actions may initially be received as analog input.

An embodiment of FIG. 3A through FIG. 3C as depicted illustrates that the vector 310 is in the same direction of movement of the user's gesture. In other implementation, the vector may be determined to be in the opposite direction of the user's gesture or motion. The difference is in perception and a manner of implementation. When the vector is aligned in the opposite direction of the gesture or movement, the user's action may be equivalent to pulling desired content, rather than moving to desired content. As mentioned, either implementation can be utilized.

From the gesture 302, sample points are determined by processing resources of the computing device. An embodiment provides that the sample points are linearized, using an appropriate algorithm, to determine the resulting vector. In an implementation of FIG. 3B, linearization is performed by using a line fitting algorithm that incorporates all of the sampled points. The line may then be extrapolated into the vector 310. Anyone of many possible techniques may be used to determine vector 310, such as, for example, linear curve fitting, plotting first and last points, selecting specific sampled points and then plotting a line through them, or determining multiple vectors and then averaging or sampling the multiple vectors.

In an embodiment in which gestures are sampled from the user touching a screen or surface, emphasis may be placed on a tail end of the sampled points as being the most accurate reflection of user intent. In FIG. 3C, a last set of sampled points 308 (e.g. five) of the gesture are used for the linearization process to determine the vector 310 of the input. As a variant, an embodiment may assume that the user's finger may naturally trail off when entering a gesture input. With such an assumption, one embodiment may discard the very last sampled points, while relying on a tail end of samples points to determine the vector 310.

Sample User-Interface Panels and Examples

Figure 4A:
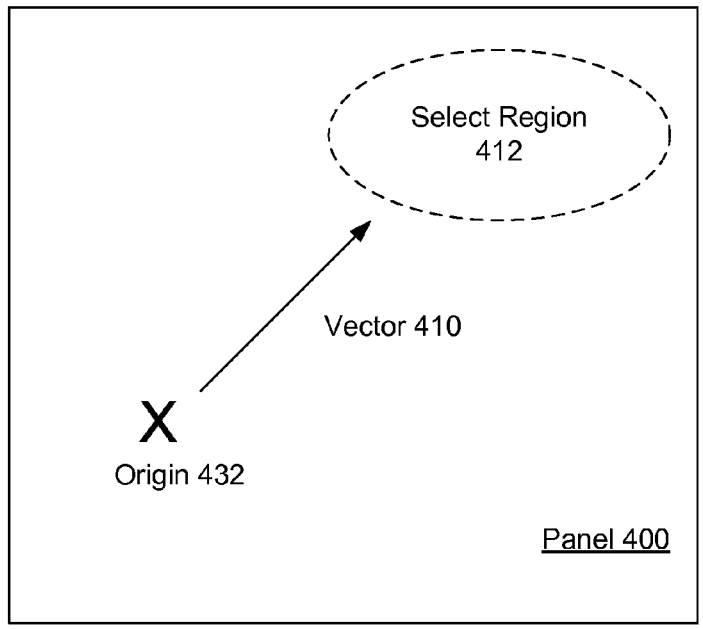
FIG. 4A and FIG. 4B illustrates a user-interface panel on which an embodiment for selecting portions thereof, in response to a non-discrete directional input action, is implemented.
Figure 4B:
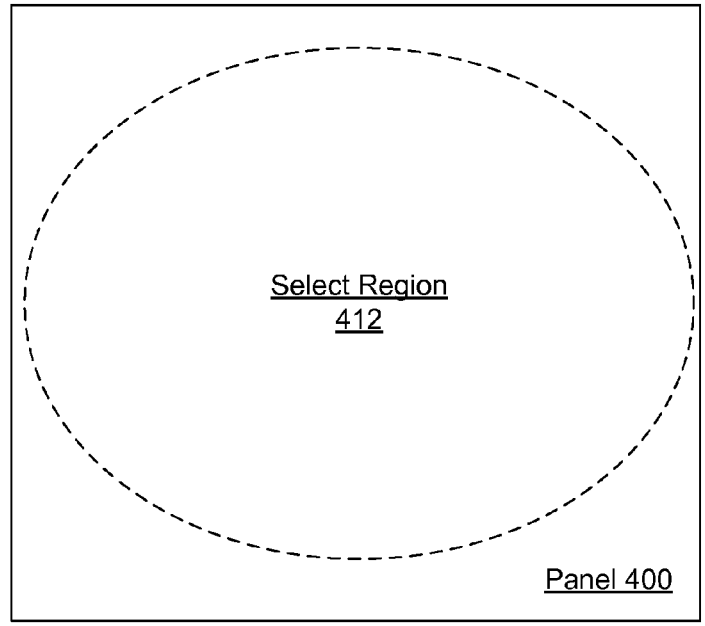

FIG. 4A and FIG. 4B illustrates a user-interface panel on which an embodiment for selecting portions thereof, in response to a non-discrete directional input action, is implemented. In FIG. 4A, a panel 400 is computer-generated and provided on a display surface of a computing device. The panel 400 displays content from, for example, a web browser, a map application (such as outputted from a GPS), document application (e.g. PDF viewer, word processor, image viewer) or other application. As depicted in FIG. 4A, the state of the panel 400 corresponds to one in which the non-discrete directional input of the user has just been received and processed into the vector 410 (i.e. step 220 of FIG. 2). While vector 410 is shown visually, it should be understood that it is only a representation of a programmatic determination that is carried through by the processing resources of the computing device that provides the panel. It may optionally be displayed to the user. The vector 410 may be referenced against a point of origin 432, which may be determined by default, or correspond to the current point of focus when the vector 410 is determined.

FIG. 4A further depicts that a region 412 of panel 400 is selected based at least in part on a directional component of the vector 410. In one implementation, the vector 410 is a programmatic tool of extrapolation. A magnitude component of the vector 410 may either (i) be assumed or not in use, (ii) determined from non-directional characteristics of the directional action. With specific reference to gesture input, the non-directional characteristics include, for example, duration of the gesture, an overall length of the gesture, or the velocity or acceleration of the vector.

As indicated in FIG. 4B, the vector is used to select region 412. In selecting region 412, one or more characteristics of the region may be used to identify that region. In an embodiment, the characteristics that are analyzed from the region delineate that region from a surrounding portion of the content. For example, the display region 412 may include visible boundaries or markers that indicate at least a substantial portion of the display region is part of the same structured data set (e.g. such as a display object).

As shown by FIG. 4B, the selected region 412 is re-displayed in an altered form. In an embodiment, the selected region 412 is enlarged to fit at least a substantial portion of the panel. Thus, for example, a map or displayed document may be enlarged to depict a region that is determined to of interest to the user, based on the determined vector.

Figure 5:
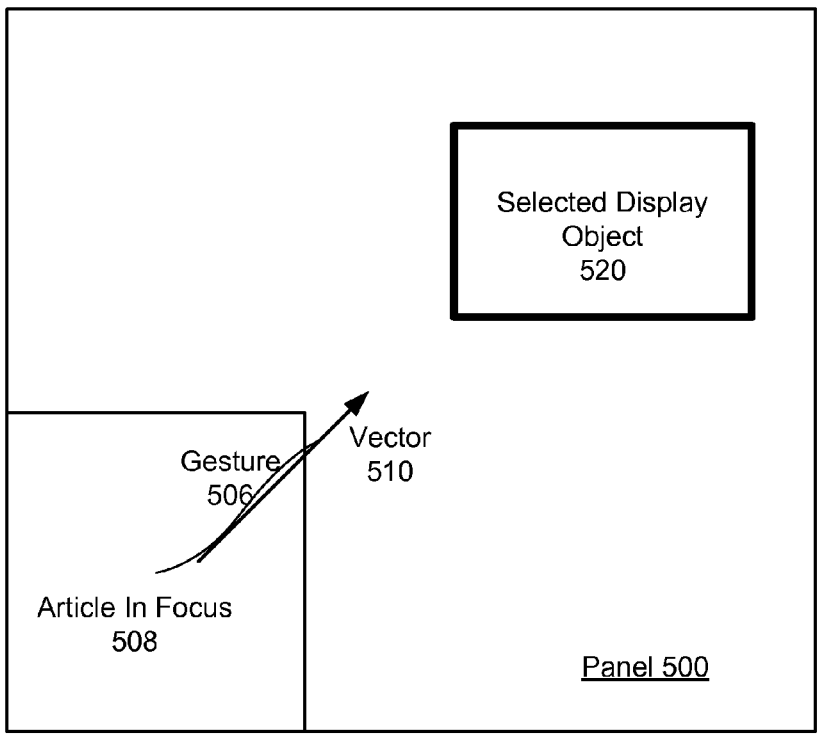
FIG. 5 illustrates another user-interface panel on which another embodiment for selecting a display object in response to a directional input action is implemented.

FIG. 5 illustrates another user-interface panel on which another embodiment for selecting a display object in response to a directional input action is implemented. As an example, panel 500 may correspond to a rendered web page carrying text/visual content may include multiple display objects, including text items (e.g. an article) and image items. For example, panel 500 may correspond to a rendered page of news article or page that includes, as display objects, multiple articles, images, and captions. The user may initiate browsing by using conventional scrolling or navigation to traverse an article (e.g. of an online newspaper). The panel 500 may be navigated from object to object (e.g. one text article to another).

According to an embodiment, a non-discrete directional action in the form of a gesture 506 from a user is generated into a vector 510 that is used to select a display object 520 that is part of the content being rendered. The display object 510 may correspond to a presentation formed from a structured data set. The selection of the display object 520 may be made using any one or more combinations of parameters. For example, the selected display object 520 may correspond to (i) nearest display object that is in line with the determined vector 510; (ii) nearest display object of a particular kind that is in line with the determined vector. In determining the nearest display object 520, the vector 510 may extrapolate from an origin. In an implementation shown, the origin may coincide with a center or region of an article 508 in focus, or alternatively, to a position of a pointer feature. As described with, for example, an embodiment of FIG. 6, other gesture characteristics may optionally be determined and incorporated into, for example, the magnitude of the vector 510.

Figure 6:
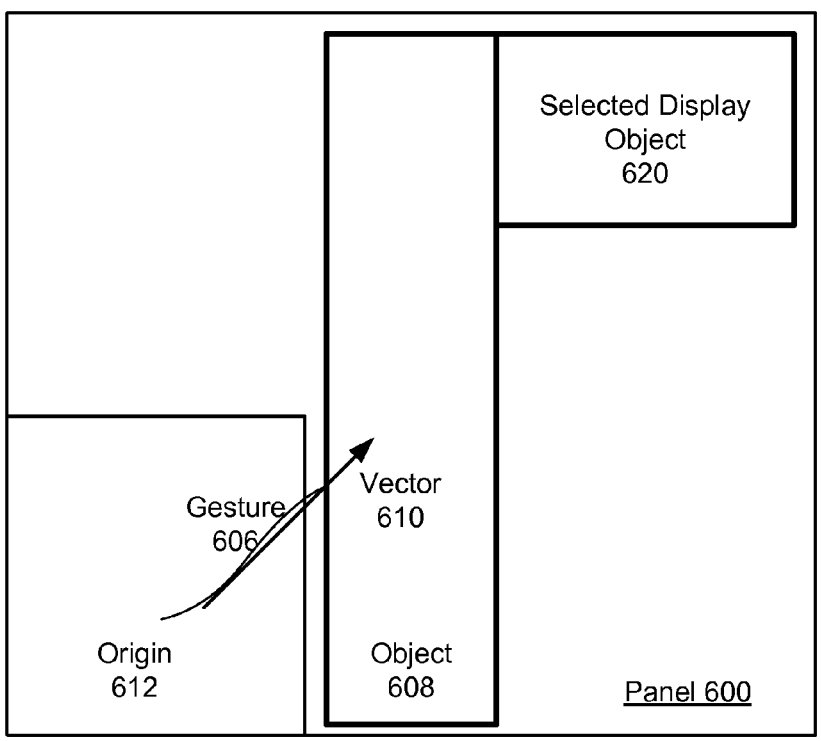
FIG. 6 illustrates still another user-interface panel on which another embodiment for selecting a display object in response to a directional input action is implemented.

FIG. 6 illustrates still another user-interface panel on which another embodiment for selecting a display object in response to a directional input action is implemented. As with other examples described herein, panel 600 may include a combination of text items, images or other forms of display objects that appear together on one panel. In the implementation shown, vector 610 is determined from the gesture 606. An embodiment of FIG. 6 depicts the use of vector 610 to select a display object 620 on panel 600, where the display object is indicated by the direction of vector, but separated from an origin 612 by one or more intermediate display objects. The intermediate display objects 608 are thus skipped when the determination of the selected display object (or display portion) is being determined. In one embodiment, an intermediate display object is skipped using magnitude information carried with the vector 610. The magnitude information may be determined from the gesture (or other directional action). The magnitude information may, for example, be determined from a velocity or acceleration of the input gesture, a duration of the gesture, or a length of the gesture.

Displaying Dense Dispersion of Links and Other Selectable Objects

As an addition or alternative to embodiments in which vectors are generated to select what is to be displayed, other embodiments may provide for analyzing content in order to selectively enlarge or otherwise enhance certain content or portions thereof in response to presence of certain conditions. In an embodiment, content on display (or available for display) is analyzed to detect presence of selectable data items. Selectable data items correspond to links, icons or other active data items, which when selected, navigate or scroll the user to another content destination, or invoke a programmatic action on the user's computer terminal.

According to an embodiment, the content on display is analyzed to determine whether the selectable data item are spatially differentiable to be readily selectable by the user through a touch interface. In context of small form factor computing devices, in particular, the display screens are limited in dimension. Moreover, such computing devices enable the user to interact with the display screen to provide input, including input for enabling the user to select a link or other selectable data item. When content is fitted for such small form factor devices, selectable data items in particular can become difficult to use. Among issues that arise with small form factor computing devices, when too many selectable data items (e.g. links) are present in a given region, the data items are not readily selectable from other links, particularly by touch. For example, the user may not be readily able to select one link over another link by touching the display screen where the individual links are being displayed, because the dimensions of the user's finger span two or more links.

FIG. 7 illustrates a method for re-displaying a region of a display that incorporates selectable data items in excess of a designated criteria, according to an embodiment. As an alternative or addition, an embodiment such as described may be implemented using, for example, components of a system such as described with FIG. 1. Accordingly, reference may be made to elements of FIG. 1 for purpose of illustrating a suitable element for performing a step or sub-step being described.

In step 710, content for display is analyzed to determine (i) a relative position of individual selectable data items that appear (or are to appear) in at least a given region of displayed content, and (ii) an overall count of the individual data items. As an alternative or variation to using vectors, selector 110 (FIG. 1) may analyze displayed content, or portions thereof, to identify the number of links or other active data items, including the relative position of individual data items to other data items on the displayed content. Content display information 127 (FIG. 1) may be used by selector 110 to detect presence and position of the individual selectable display objects. For example, in one implementation, the rendered content is a web page, and the selector 110 uses DOM information to determine presence and position of selectable links or other display items on the web page.

Step 720 provides that a density or proximity calculation is made for determining spacing amongst or between selectable display objects that appear in displayed content. The density/proximity calculation may be made using any one or more techniques, such as, for example, (i) counting the number of selectable display items in a given region of the displayed content to determine the density of such items in the region, and/or (ii) calculating a proximity or spatial distance between selectable display items as displayed on a display screen of the computing device. In one implementation, selector 110 may analyze DOM information or other content display information 720 in order to make the determination. The determination may be adjusted for zoom or text size.

In step 725, a determination is made to whether a pre-determined threshold is triggered as to conclude links are too densely dispersed on the display. The threshold may correspond to, for example, (i) a minimum spacing between selectable display items in at least a portion of the displayed region, and/or (ii) a number of selectable display items in a given region of the displayed content. In one embodiment, determination may be a design parameter, influenced by the display screen size, and the ability of the user to distinguish and select adjacent links or data items using touch.

As a variant, heuristics may also be used to set the threshold as to when links or other selectable data items are too tightly spaced. For example, the device may track instances when the user selects a link, then immediately hits return to return to the previous page. Such occurrences may be deemed inadvertent selection of the wrong links. The context of such link selection may be monitored (e.g. zoom factor on web page) and its re-occurrence may be used as part of the threshold.

Any of the steps 710-725 may be performed responsively to an event, such as (i) content being generated for display (e.g. a web page being rendered for display), (ii) a user selecting to navigate, scroll or otherwise select a display region of content on display (such as described with prior embodiments, in response to non-discrete input action). Thus, for example, a user may render a web page, enter a gesture or other non-discrete directional input action to scroll to a different portion of the web page, and then have the analysis described in steps 720/725 performed on-the-fly or responsively to the action.

If the determination is that the threshold of the density determination is met, then step 730 provides that at least some of the selectable data items that are deemed to be part of the determined density are re-displayed in a manner that separates the items. By separating the data items, the user is more readily able to select the individual links by contacting the display screen of the device at the position of the re-displayed link or data item. Else, if the spacing or dispersion of the links is not too dense, then step 740 provides that no alteration is made to the displayed content and how the selectable display items are displayed.

FIG. 8A and FIG. 8B represent user interface panels that are an implementation of an embodiment depicted in FIG. 7. In FIG. 8A, a panel portion 810 is displayed on, for example, a mobile computing device having a relatively compact or small form factor display screen. The displayed panel portion 810 may be in form or, for example, a rendered web page having selectable display items 812 in form of links or active icons. As mentioned with other embodiments, embodiments may be implemented with other forms of content, such as presentation of images, maps, documents etc. In an embodiment such as shown by FIG. 8A, a cluster of selectable links 812 or other data items are identified for presence and position. As shown, the links are closely pact, so as to be deemed dense beyond the threshold such as described with FIG. 7. When densely presented, the links may not be readily distinguishable to selection by touch or content-based input. As a specific example, small form-factor devices sometimes use touch or contact sensitive displays as a mechanism for enabling users to enter input, particularly in the context of making a selection of a selectable data item (such as displayed link on a web page). When links are too densely presented on such devices, a person's finger may not be able to reliably distinguish one link for another. A density threshold may be pre-determined to coincide with when links are deemed to be too closely presented.

FIG. 8B illustrates the cluster of selectable links are redisplayed in enlarged form 822, so that the individual links are separated when presented. In the re-displayed form, the user is more able to select individual links in the cluster by touching the display screen at the position corresponding to the re-displayed link.

According to an embodiment, a method such as described may be performed in response to some user action that designates a certain region of the display for analysis of links or other selectable display items. For example, as described with embodiments of FIG. 1 and FIG. 2 and elsewhere, a density or proximity analysis such as described may be performed in response to a non-discrete directional input action that identifies (i) a specific data item or set of data items that are tightly clustered, or (ii) a region of content on display that contains clustered data items.

With regard to embodiments of FIG. 7, FIG. 8A and FIG. 8B, a threshold for deeming proximity of selectable display items as being too close or dense may be based in part on the zoom factor that is selected. For example, on a given web page, all links may be deemed to densely presented if the user has selected a zoom factor that is too small. Accordingly, any portion of the web page that contains links may be re-displayed under that zoom factor. Conversely, larger zoom factors may not require implementation of an embodiment where links in a portion of the page are re-displayed to be enlarged or separated.

Hardware Diagram

FIG. 9 illustrates a hardware diagram for a computing device that is configured to implement one or more embodiments described herein. A computing device 900 may be configured to implement, for example, a system such as described with FIG. 1, or computer-implemented methods such as described with FIG. 2 and FIG. 7. According to one or more embodiments, the computing device 900 corresponds to a mobile and/or multi-functional devices having voice-telephony and messaging capabilities across either voice or data channels. An example of such computing devices is a cellular telephony/messaging device. Such devices often are often equipped with ancillary functionality, such as image/video capture, media playback, and Global Positioning System (e.g. for navigation). Typically, such devices enable wireless communications in the form of one of cellular transmissions, using cellular transmission protocols and networks that support, for example, GSM, CDMA, Edge, 3G networks. Still further, such devices often have the ability to communicate using other forms of wireless communication mediums, such as provided through (i) Wireless Fidelity (i.e. "WiFi" or 802.11(b), (g) or 802.11(n)), (ii) Worldwide Interoperability for Microwave Access (WiMAX), (iii) or local wireless communication such as wireless USB or Bluetooth.

Typical functionality incorporated into such voice-telephony devices includes messaging, such as text (e.g. such as provided by Short Message Service (SMS) or Instant Messaging), media messaging (e.g. such as Multimedia Messaging Service (MMS), or email applications and service. Other forms of wireless or wireline communications are possible. For example, in one embodiment, a proprietary inductive data exchange may be enabled between the computing device and another device. As another example, the device may be equipped with an acoustic circuit to enable it to communicate with another circuit or element. In the mobile computing device context, the telephony service may be provided by either cellular carriers and networks, or Voice over Internet Protocol (VoIP) connections (e.g. which may be enabled through WiFi or other network connectivity).

Embodiments described herein may be implemented on other types of computing devices as well. Examples include desktop or personal computers, or network enabled tables or computers. Other forms of computing devices include devices that are oriented as media players, Global Positioning devices, or automobile computer systems.

Form factors for computing devices may vary. Typical examples include a desktop computer, laptop or folding computer, ultramobile computer, tablet computer, portable or handheld device, finger-sized computing device, or computing device in an integrated environment (home, automobile). As an alternative to a single computing device, the system described may itself be implemented and distributed on a collection of devices, of which at least some include processing capabilities.

Accordingly, in an embodiment, device 900 includes processing resources that include at least a processor 910, as well as memory resources 915, a display assembly 920, one or more wireless communication sub-systems 930, and mechanical input features 940. The computing device 900 includes various input mechanisms, including, for example, buttons or switches 908. One of the input mechanism may include an interface component 905 for detecting non-discrete directional input actions, such as gestures. In an embodiment, the interface component uses or corresponds to one or more sensors 922 that detect the user touching a surface of the computing device in forming a gesture or other touch input. In one implementation, at least a portion of the interface component 905 (e.g. sensors 922) are integrated or coupled with the display assembly 920, so as to form a touch-sensitive display assembly. A gesture may correspond to the user forming a shape or line on the display surface of the computing device. As a variant, the one or more sensors 922 may be integrated into another surface of the computing device, such as on a front panel or touch pad that is integrated into the computing device. Thus, the human interface component 104 (see FIG. 1) may be integrated or embedded into other components of the computing device, such as the display or exterior surface of the computing device.

In an embodiment, at least one of the wireless communication sub-system 930 sends and receive cellular data over data channels 902 and voice channels 904. Messages over SMS and MMS transports are communicated over voice channels 904. Emails and instant messages are communicated over data channels 902. Typically, email and instant messaging may be communicated by either a cellular medium or an alternative medium (e.g. WiFi, WiMAX, wireline), but this does not necessarily need to be the case. To accommodate more than one transport medium, the device 900 may include more than one wireless subsystem.

The processor 910 is configured with software and/or other logic to perform one or more processes, steps and other functions described with embodiments such as described by FIG. 2 or FIG. 7. Additionally, the processor 910 may generate panels and functionality that are represented by the various described panels, such as provided by FIG. 4A, FIG. 4B, FIG. 5, FIG. 6 and FIG. 8A and FIG. 8B. Accordingly, processor 910 may be configured, with instructions and data stored in memory resources 915, to implement the system 100 (as described with FIG. 1) or computer-implemented methods such as described with FIG. 2 and FIG. 7. In one implementation, interface component 905 receives non-discrete input action 911, which is vectorized by logic of the interface component or processor 910. From the determination, selector 110 (executing on processor 910) selects a display object 921 or region, which is then rendered on the display 920.

While FIG. 9 is illustrated for a mobile computing device, one or more embodiments may be implemented on other types of devices, including multi-functional devices (e.g. camera or GPS enabled devices that have messaging enabled on different transports), or full-functional computers such as laptops.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing device comprising:
   a display surface;
   processing resources that are configured to:
   present content on the display surface, including a plurality of selectable data items on a sub-region of the display surface;
   analyze at least a portion of a content on the display surface that includes the plurality of selectable data items to determine a spacing between at least some of the plurality of data items, the spacing being determined by performing a density calculation based, at least in part, on a number of data items in the sub-region; and
   responsive to determining, based on the density calculation, that the spacing between the selectable data items is less than a pre-determined threshold, redisplay at least a portion the content to enhance the user's ability to select a desired data item and not inadvertently select an undesired data item.

2. The computing device of claim 1, wherein the processing resources are configured to analyze at least a portion of a content by determining, for individual selectable data items, a proximity of a nearest selectable data item.

3. The computing device of claim 1, wherein the selectable data items correspond to individual links.

4. The computing device of claim 1, wherein the processing resources determine the spacing by using document object model information provided by a browser that runs on the computing device.

5. A method for operating a computing device, the method being performed by one or more processors of the computing device and comprising:
   presenting content on a display surface of the computing device, including a plurality of selectable data items on a sub-region of the display surface;
   analyzing at least a portion of a content on the display surface that includes the plurality of selectable data items to determine a spacing between at least some of the plurality of data items, the spacing being determined by performing a density calculation based, at least in part, on a number of data items in the sub-region; and
   responsive to determining, based on the density calculation, that the spacing between the selectable data items is less than a pre-determined threshold, redisplaying at least a portion the content to enhance the user's ability to select a desired data item and not inadvertently select an undesired data item.

6. The method of claim 5, wherein analyzing at least a portion of a content on the display surface includes determining, for individual selectable data items, a proximity of a nearest selectable data item.

7. The method of claim 5, wherein the selectable data items correspond to individual links.

8. The method of claim 5, wherein analyzing at least a portion of a content to determine a spacing between at least some of the plurality of data items includes using document object model information provided by a browser that runs on the computing device.

9. A non-transitory computer readable medium storing instructions that, when executed by one or more processors, causes the one or more processors to perform steps comprising:
   presenting content on a display surface of a computing device, including a plurality of selectable data items on a sub-region of the display surface;
   analyzing at least a portion of a content on the display surface that includes the plurality of selectable data items to determine a spacing between at least some of the plurality of data items, the spacing being determined by performing a density calculation based, at least in part, on a number of data items in the sub-region; and
   responsive to determining, based on the density calculation, that the spacing between the selectable data items is less than a pre-determined threshold, redisplaying at least a portion the content to enhance the user's ability to select a desired data item and not inadvertently select an undesired data item.

10. The non-transitory computer readable medium of claim 9, wherein the instructions cause the one or more processors to analyze at least a portion of a content on the display surface by determining, for individual selectable data items, a proximity of a nearest selectable data item.

11. The non-transitory computer readable medium of claim 9, wherein the selectable data items correspond to individual links.

12. The non-transitory computer readable medium of claim 9, wherein the instructions cause the one or more processors to analyze at least a portion of a content to determine a spacing between at least some of the plurality of data items by using document object model information provided by a browser that runs on the computing device.

* * * * *